United States Patent [19]

Leschinger

[11] Patent Number: 4,661,651
[45] Date of Patent: Apr. 28, 1987

[54] FLOOD COVER ASSEMBLY FOR PEDESTAL CLOSURES AND METHOD OF INSTALLING SAME

[75] Inventor: Matt Leschinger, Wheaton, Ill.

[73] Assignee: Reliance Comm/Tec Corporation, Chicago, Ill.

[21] Appl. No.: 854,532

[22] Filed: Apr. 22, 1986

[51] Int. Cl.[4] .............................................. H02G 9/02
[52] U.S. Cl. ...................................... 174/38; 29/469; 220/346
[58] Field of Search ................... 174/37, 38; 220/346; 29/469

[56] References Cited

U.S. PATENT DOCUMENTS 3,480,721 11/1969 Baumgartner ........................ 174/38
3,892,910 7/1975 Smith .................................... 174/37
4,058,670 11/1977 Leschinger .......................... 174/38
4,585,141 4/1986 Marks ............................... 174/38 X

*Primary Examiner*—Laramie E. Askin
*Attorney, Agent, or Firm*—Michael M. Rickin

[57] ABSTRACT

A flood cover assembly for installation over pedestal closures. The assembly includes a mounting bracket. One of the bolts used to hold the pedestal closure front cover in place is used to secure the mounting bracket to the pedestal closure. The mounting bracket has its own bolt. A flood cover consisting of a bell jar type cover and a bracket attached thereto is then brought into engagement with the mounting bracket bolt. The completed assembly prevents flood waters from reaching the terminal block located in the pedestal closure.

12 Claims, 6 Drawing Figures

FLOOD COVER ASSEMBLY FOR PEDESTAL CLOSURES AND METHOD OF INSTALLING SAME

BACKGROUND OF THE INVENTION

1. Field of the Invention

This invention relates to flood covers and more particularly to a flood cover which is capable of being easily installed and removed from pedestal closures which are already in place.

2. Description of the Prior Art

In the telecommunications industry, pedestal closures are used to provide a place where cable pairs may be interconnected to each other. Such interconnections are made at a connector block which is mounted inside the closure. The connector block includes a number of terminals and the pairs of wires in the cable are stripped of their insulation and connected to the terminals. It is quite important that moisture be prevented from reaching the exposed portions of the cable at the terminals.

In some instances it may be required to locate the pedestal closures in areas, such as the Gulf Coast of the U.S., which are subject to periodic flooding. In other instances a change of grade may give rise to a low lying area thereby causing a previously installed pedestal closure to be subject to flood waters. It is, therefore, necessary to provide a cover for the pedestal closure which will prevent the flood waters from reaching the terminals of the connector block. This flood cover is a separate cover because normal conditions require internal ventilation of the pedestal closure. When flooding is expected, the cover is placed over the regular cover of the pedestal closure. In the presence of flood waters, a volume of air is trapped inside the flood cover due to the bell jar effect. This trapped air prevents the water from rising inside the flood cover. By appropriate sizing of this volume of air and by properly selecting the position of the mouth of the flood cover in relation to the connector block, the flood waters may be prevented from reaching the terminals of the block.

It is, however, necessary that the mouth of the flood cover be kept fixed at the selected position. Keeping the position of the mouth fixed ensures that the increased pressure on the trapped air column as flooding occurs will not try to "float" the flood cover, to relieve the increase in internal air pressure. If the mouth position were to rise, then the flood waters could rise to the level of the connector block terminals causing a service outage. Maintaining the mouth in the desired fixed position requires that the flood cover be locked to the outer surface of the pedestal cover.

Some typical techniques used to lock the flood cover to the pedestal closure include those which require a clamping bracket to be positioned around the pedestal closure column. The flood cover is then placed over the pedestal closure and is fastened to the clamping bracket by a bolting means or a bayonet-locking means.

Another technique involves the placing of screws at the bottom of the flood cover. The screws are then screwed radially toward the pedestal closure with opposing screws providing the locking action. This technique is not very efficient as the tightening of one of the screws may cause the other screws to in effect become loose. It is, therefore, difficult with this technique for the craftsperson to know if and when a tight fit has been made. Quite often the flood cover uses a chain as an additional restraining device to prevent the cover from floating away.

A screw-clamp locking technique requires positive location of the clamping means on the pedestal closure. This has the potential to mar the finish of the pedestal closure when it is made of metal, and may require additional surface preparation prior to installation, in anticipation of the use of a flood cover on that specific pedestal closure. In the presence of flood waters such marring can lead to accelerated corrosion of the pedestal closure. Even if the pedestal closure is of the non-metallic type, the pressure of the fasteners, due to their geometrical shape and small contact area, can lead to indenting or fracture of the pedestal closure. Finally, if the fasteners are insufficiently tightened, the position of the clamp may change, especially in the presence of flood waters, since the flood cover tries to rise as a result of the compression of the air volume trapped inside of it.

It is therefore desirable that there be provided a flood cover which does not mar the finish of a metallic pedestal closure or indent or fracture a pedestal closure of the non-metallic type in the presence of flood waters and that may be functionally installed on an in-place pedestal closure without subsequent alteration of the pedestal closure. It is further desirable that the flood cover be relatively easy to install and remove, as it may only be installed prior to periods of expected flooding, such as the spring thaw, and removed after the waters have subsided.

SUMMARY OF THE INVENTION

A flood cover assembly for placement over a vertically standing pedestal closure. The pedestal closure has at least one closure fastener in the form of a rotatable bolt with a head captured in its outside surface.

The flood cover assembly includes a flood cover including a bell jar type cover having a rigid mouth. A first bracket is connected in the mouth such that a part of that bracket projects outwardly. The first bracket has a slot therein.

The assembly also includes a second bracket. That bracket has a first part which has a slot. The width of the slot is sufficient to allow the second bracket to be slid under the bolt head when the closure fastener is loosened. The bracket has a second part which is at an angle from the first part. The angle is such that the second part engages part of the outside surface of the pedestal closure when the first part of the bracket is slid under the head of the closure fastener. The bracket further has a third part which is connected to the first part so that it projects outwardly therefrom. The third part has a fastener with a head in it. That fastener can be loosened or fastened by rotating the head.

The width of the slot in the first bracket is sufficient to allow that slot to be slid under the head of the fastener in the third part of the second bracket. This allows the flood cover to be brought into engagement with the second bracket.

DESCRIPTION OF THE PREFERRED EMBODIMENT

Figure 1:
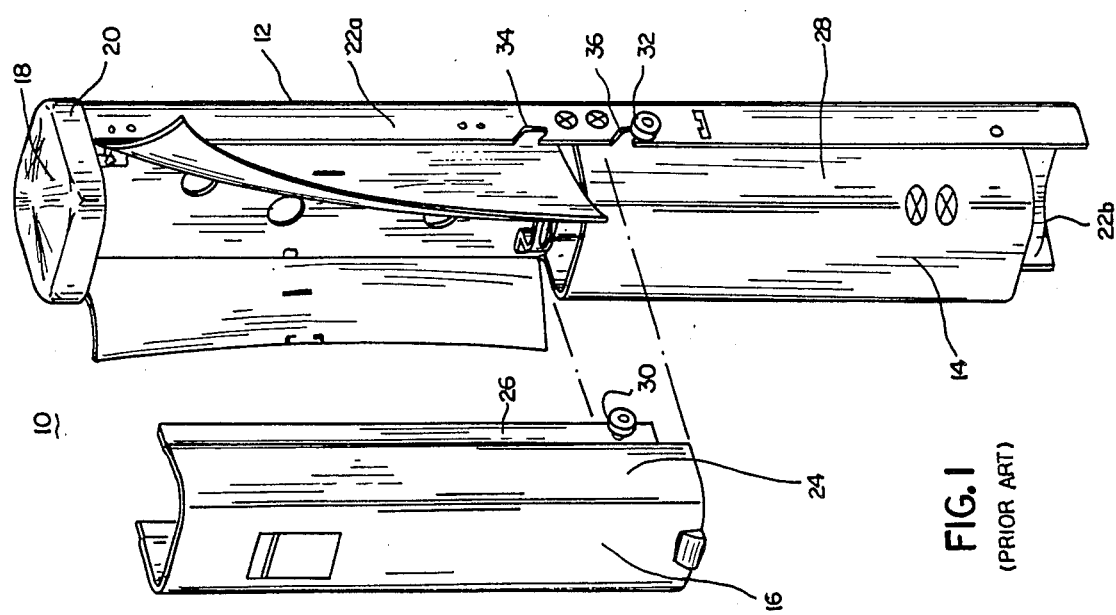
FIG. 1 is an exploded perspective view of a representative pedestal closure on which the flood cover assembly of the present invention may be installed.

Referring now to FIG. 1 there is shown an exploded perspective view of a representative pedestal closure 10 on which the flood cover assembly of the present invention may be installed. Pedestal closure 10 is of a type well known in the art and may, for example, be one of the CAD series of pedestal closures sold by assignee's Reliable Electric operating unit. As pedestal closure 10 is well known in the art, only those parts of the pedestal closure necessary for an understanding of my invention will be described. A detailed description of one prior art pedestal closure may be had by referring to my U.S. Pat. No. 4,058,670.

Pedestal closure 10 includes a housing assembly formed from three major elements. There is a rear housing 12 and there are lower and upper front covers 14 and 16, respectively. All three main elements of the pedestal closure 10 are substantially channel shaped and consequently each of them comprises a web and spaced flanges extending from the opposite sides of the web. The rear housing 12 includes a cap 18 which has a skirt 20 around its entire periphery. The skirt 20 is riveted to the upper end of the rear housing 12. The cap 18 projects forwardly of the rear housing 12 to receive the upper front cover 16 and thereby functions as a roof of the pedestal closure 10. Cap 18 may also be a two-piece cap in which one part is attached to the rear housing 12 and the other is attached to upper front cover 16 or any other type of cap well known to those in the art. A terminal connector block (not shown) of any type well known in the art is typically mounted in the upper portion of housing 12.

As shown in FIG. 1 and as is well known in the art, the rear housing 12 includes vertically elongated forwardly projecting flanges 22a, 22b. Only the flange 22a is clearly shown in FIG. 1. The other flange 22b is identical in construction to flange 22a. Both the lower and upper front covers 14 and 16 have vertically elongated rearwardly projecting flanges with offset mounting portions. Only the flange 24 and associated offset mounting portion 26 for upper cover 16 is clearly shown in FIG. 1. The other flange and mounting portion for cover 16 is identical. With respect to cover 14, only the flange 28 is clearly shown in FIG. 1. The other flange and both of the offset mounting portions are not shown but they are substantially identical to flange 28 and offset portion 26 of cover 16, respectively.

As shown in FIG. 1, the mounting portion 26 includes a cupped washerbolt 30 of the type well known to those in the art. The bolt has a special hex head which will accommodate a telephone industry standard tool. The other flange of upper cover 16 also may have a bolt (not shown) which is mounted therein in exactly the same position as bolt 30. In a similar manner the two flanges of cover 14 each includes cupped washerbolts 32, only one of which is shown in FIG. 1. Bolts 30 and 32 are identical in construction. The bolts are used to secure their respective covers to the rear housing 12.

In order that the covers 14, 16 can be secured to housing 12, the flanges 22a, 22b each has therein two guideways 34 and 36. Only the guideways associated with flange 22a are shown in FIG. 1, the guideways located on flange 22b being identical in shape and location. Guideway 34 is associated with bolt 30, i.e. with upper cover 16, and guideway 36 is associated with bolt 32, i.e. with lower cover 14. When closure 10 is fully assembled, the bolts 30 and 32 are inserted in their associated guideways 34 and 36 and tightened with the use of the industry standard tool mentioned above.

Figure 2B:
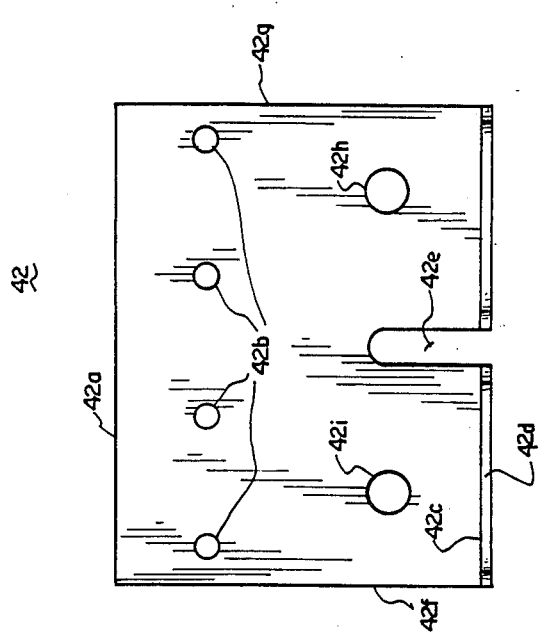
FIG. 2b is a front view of the bracket of FIG. 2a prior to attachment to the cover.
Figure 2A:
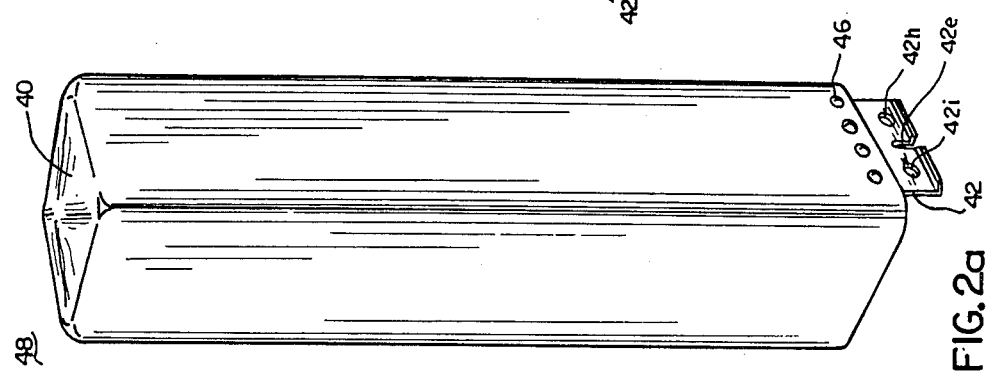
FIG. 2a is a perspective view of the flood cover of the present invention showing the cover and bracket attached thereon.
Figure 2C:
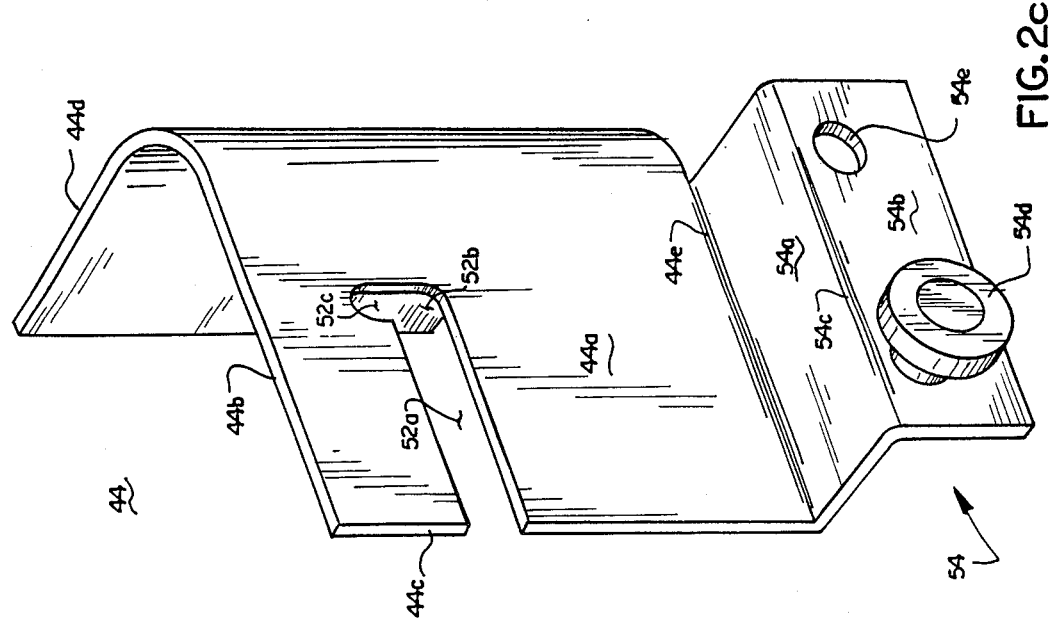
FIG. 2c is a perspective of the mounting bracket of the present invention by which the flood cover of FIG. 2a can be attached to a pedestal closure to thereby form the assembly of the present invention.
Figure 4:
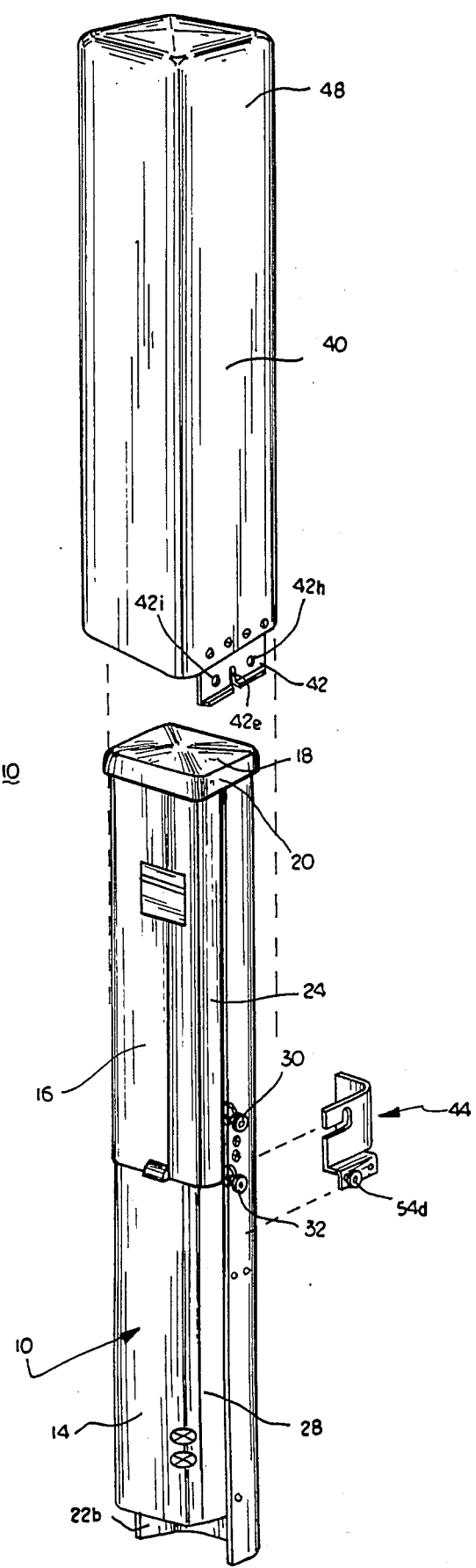
FIG. 4 shows an exploded perspective view of the flood cover assembly of this invention in a position to be installed on the pedestal closure of FIG. 1.

Referring now to FIGS. 2a, b, c and FIG. 4 there is shown in FIG. 2a a perspective of a cover 40 and a bracket 42 attached thereon, in FIG. 2b a front view of bracket 42 prior to its being attached to cover 40 and in FIG. 2c a perspective of the mounting bracket 44 by which the cover and bracket of FIG. 2a can be attached to the pedestal closure 10.

FIG. 4 shows an exploded perspective view of the flood cover assembly in a position to be installed over pedestal closure 10.

As seen in FIG. 2a and FIG. 4, the cover 40 has a shape which is substantially identical to that which pedestal closure 10 has when the lower and front covers 14 and 16 are installed in place. The actual dimensions of the cover 40 depend on the dimensions of the pedestal closure 10 over which it is to be placed. Cover 40 is typically rigid in form. It can be molded out of any suitable material such as polyvinyl chloride or polyethylene, or fabricated from sheet or drawn metal, as long as the finished shape provides a bell jar type shape with air-tight joints. The cover may be either one piece or have seams, as long as they are airtight.

Also as seen in FIG. 2a there is attached to cover 40 a bracket 42. The bracket 42 is attached to the cover 40 by fasteners 46. As shown in FIG. 2b the bracket 42 is substantially rectangular in shape. Adjacent to its top edge 42a it has a multiplicity of holes 42b which receive fasteners 46 when the bracket is attached to the cover 40. Adjacent to its bottom edge 42c, bracket 42 has been upset to thereby form a narrow frontwardly projecting ledge 42d. Ledge 42d, while not necessary to the operation of my invention, may aid in retaining the cover in position after assembly with pedestal closure 10. Its function will be described in more detail hereinafter.

Finally, bracket 42 includes in lower edge 42c a slotted opening 42e which projects upwardly a predetermined distance towards top edge 42a. As shown in FIG. 2b, the slot 42e is located substantially in the center of bracket 42. It could be located off center, i.e., closer to either left or right edge 42f or 42g, but placing it substantially in the center provides the advantage of helping to keep cover 40 from tilting in one direction or another when the cover is installed on pedestal closure 10.

Bracket 42 is attached to cover 40 by fasteners 46. It is attached to that side of cover 40 which will be parallel to the right side of pedestal closure 10 when the cover 40 is placed over the pedestal closure.

In FIG. 2c and FIG. 4 there is shown the mounting bracket 44 which provides the means by which the combination of cover 40 and bracket 42 is attached to pedestal closure 10. The combination of cover 40 and bracket 42 will be referred to hereinafter as the flood cover 48. Mounting bracket 44 has a first substantially rectangularly shaped portion 44a. Projecting rightwardly from the left edge 44c at a point approximately half way between upper edge 44b and lower edge 44e is a first slot 52a. The slot 52a is of a predetermined length. A second slot 52c extends upwardly a short distance from the rightmost end 52b of slot 52a. The openings of slots 52a and 52c are slightly larger than the diameter of the shaft of cupped washerbolt 32 but less than the diameter of the head of the bolt.

Bracket 44 includes a second substantially rectangular portion 44d which extends rearwardly at substantially a right angle from what is in effect the right side of portion 44a. Portions 44a and 44d are formed from a single sheet of metal and there exists a curved transition from portion 44a to portion 44d. The function of portion 44d will be described hereinafter.

Finally, bracket 44 includes a step-shaped flange 54 which is integrally attached to bracket 44 at bottom edge 44e of portion 44a. Flange 54 includes a first substantially rectangular portion 54a which projects outwardly a predetermined distance from edge 44e at substantially a right angle. Flange 54 further includes a second substantially rectangular portion 54b which projects downwardly a predetermined height at substantially a right angle from the outer edge 54c of portion 54a.

As shown, portion 54b has inserted therein a cupped washerbolt 54d. The hole in which the bolt 54d is inserted is slightly to the left of center of portion 54b. Cupped bolt 54d is identical to previously described cupped bolts 30 and 32. As with bolts 30 and 32, the portion of bolt 54d which projects through portion 54b may be upset to prevent the bolt from being completely removed.

Figure 3:
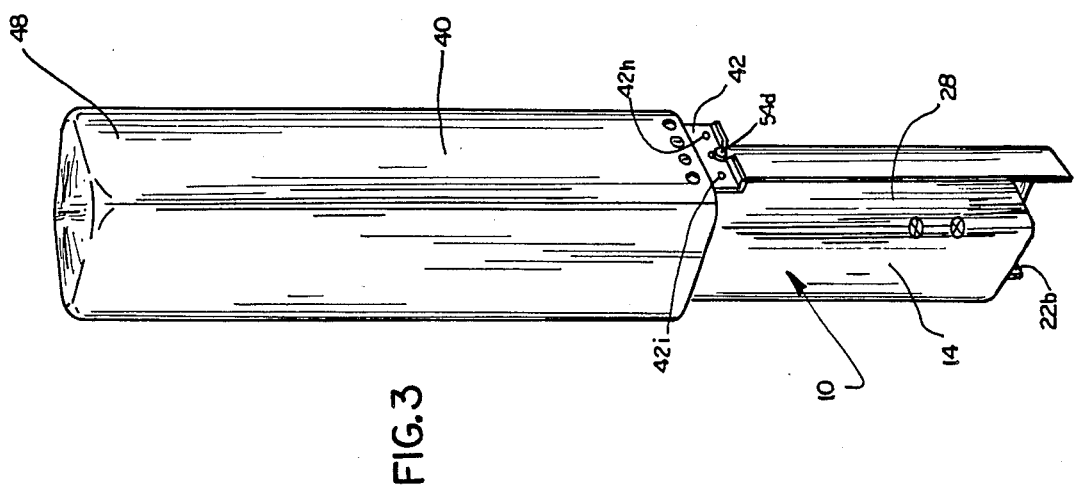
FIG. 3 is a perspective view of the flood cover assembly of the present invention installed on a pedestal closure.

Referring now to FIG. 3 there is shown a perspective view of pedestal closure 10 with flood cover 48 and mounting bracket 44 (not seen in FIG. 3 as it is hidden by flood cover 48) installed thereon. The steps by which the flood cover 48 and mounting bracket 44 are installed on pedestal closure 10 will now be described with reference to FIGS. 1, 2a, 2b, 2c and 4. Flood cover 48 may be installed on a new or existing pedestal closure 10. In either case the pedestal closure 10 will be a completely assembled unit, i.e., lower and upper front covers 14 and 16 will be installed in their proper locations on rear housing 12.

The procedure for installing the flood cover 48 and mounting bracket 44 is as follows:

(1) using the well known industry standard tool, a craftsperson loosens cupped washerbolt 32 on the right side of pedestal closure 10. This is the bolt which holds the lower front cover 14 in place on the pedestal closure 10. The bolt is loosened only an amount sufficient to allow the mounting bracket 44 to slip beneath its cup;

(2) the mounting bracket 44 is then slipped under the cup of bolt 32 in a manner such that the screw shaft of bolt 32 ends up in slot 52c of bracket 44. After such installation, rectangular portion 44d of bracket 44 will extend toward the left side of pedestal closure 10 and will be parallel to the rear of the pedestal closure. Engaging the screw shaft of bolt 32 in slot 52c positions mounting bracket 44 in line for bracket 42. Slot 52c prevents cocking and natural slipping of bracket 44 from pedestal closure 10;

(3) using the industry standard tool, the bolt 32 is then tightened to hold bracket 44 in place;

(4) if not already loosened, the cupped bolt 54d on mounting bracket 44 is loosened by use of the industry standard tool. The flood cover 48 is then placed over pedestal closure 10 such that the slot 42e of bracket 42 slides over the screw shaft of bolt 54d. The bolt 54d is then tightened to hold the flood cover 48 in engagement with mounting bracket 44.

Performing this procedure in reverse will result in an easy removal of an installed flood cover. Mounting bracket 44 may either be removed or left on the pedestal closure as desired.

As now can be well understood, slot 52c of mounting bracket 44 allows for a positive engagement of bracket 44 on the rear housing 12 of pedestal closure 10. This will tend to keep the bracket 44 in position even if bolt 32 is not sufficiently tightened. Further, second portion 44d of bracket 44 provides a means to engage the rear of pedestal closure 10 and thereby help in maintaining bracket 44 in position even if bolt 32 is not sufficiently tightened. The curved transition between portions 44a and 44d of bracket 44 aids in that engagement in that the transition is complementary to the curved corner edge of pedestal closure 10 between its right side and its rear.

As can further be understood, the ledge 42d of bracket 42 helps maintain flood cover 48 in place in the event bolt 54d is not sufficiently tightened. The pressure of the water always tries to force flood cover 48 to rise. If bolt 54d were for some reason left slightly loose, then in the absence of ledge 42d the cover would so rise. Flood waters could then reach the connector block inside of pedestal closure 10. Ledge 42d engages the head of bolt 54d and that engagement may be sufficient to maintain the flood cover 48 in place in the presence of rising water even if bolt 54d were not fully tightened.

As is well known, with flood cover 48 in place, rising water will seal the bottom opening of the air column trapped inside the cover. As the water continues to rise, the pressure on the trapped air column will continue to increase. This buoyancy force on flood cover 48 would try to raise the cover in order to reduce this pressure to zero. Securely tightening bolts 32 and 54d will keep the cover in place. Even if one or both bolts were not securely tightened, the features described above on mounting bracket 44 and bracket 42 would serve to keep the cover in place. Of course, such features are not essential to the operation of my invention as long as the bolts are securely tightened. They only serve to further enhance the basic feature of my invention which is a flood cover which is easily installable on and removeable from previously installed closures.

Referring once again to FIGS. 2b and 2c there is shown in bracket 42 two holes 42h and 42i and in mounting bracket 44 a hole 54e, respectively. Hole 42h is located to the right of slot 42e. Hole 54e is located to the right of bolt 54d on rectangular portion 54b. The distance between the center of slot 42e and the center of hole 42h is the same as the distance between the center of bolt 54d and hole 54e. Therefore, when the flood cover is installed on mounting bracket 44, holes 42h and 54e are in alignment with each other. A padlock or other secondary locking device may then be installed through the holes to keep flood cover 48 engaged with mounting bracket 44 even if bolt 54d were to be loosened, as for example, by vandalism.

Hole 42i of bracket 42 is located to the left of slot 42e. This hole may serve a useful purpose when very large flood covers are installed. As described above, the rising waters will give rise to a buoyancy force on flood cover 48. For very large covers that force may be sufficient to cause the entire pedestal closure to rise up out of the ground in which its lower portion was originally buried. One end of a chain may be looped through hole 42*i* and secured to the chain. The other end of the chain may be secured to a stake which is driven into the ground. In this manner the pedestal closure and flood cover combination will be kept from floating away in the presence of rising flood waters.

It should be appreciated that while my invention has been described with respect to a pedestal closure of a particular type and having a particular shape, it may be used with pedestal closures of any type and shape, be it round, rectangular or square. All that is required is a corresponding change in shape of bracket 44 to accommodate the shape of the pedestal closure. It should also be appreciated that while bracket 44 has been described as having a curved transition between portions 44*a* and 44*d*, this transition can also be in the form of a right angle, i.e., a sharp transition.

It should also be appreciated that while mounting bracket 44 is shown as having a slot 52*c* extending upwardly, it can also have a slot (not shown) complementary to slot 52*c* extending downwardly. This slot would allow bracket 44 to be installed on pedestal closure 10 so that portion 44*d* will be parallel to the front of the pedestal closure. It should further be appreciated that while brackets 42 and 44 have been described as having slots 42*e* and 52*a* and 52*c* respectively, of the type shown in the figures, those slots can be of the keyhole type or any other type and need not open to the bottom or side of the corresponding bracket. All that is required is that in some manner the brackets 42 and 44 be brought into engagement with the associated bolt 32 and 54*d*, as for example by having some portion of the slot large enough to fit over the head of the bolt. Finally, it should be appreciated that bracket 44 is attached to bolt 32 rather than bolt 30 so that flood waters are kept further away from the connector block which is typically mounted in the upper portion of the pedestal closure.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A flood cover assembly for placement over a vertically standing pedestal closure having an outside surface, said pedestal closure having at least one rotatable closure fastener means having a head, said closure fastener means captured in said outside surface such that said closure fastener means can be loosened or tightened by rotating said head, said assembly comprising:
   (a) a flood cover including a bell jar type cover having a rigid mouth and first bracket means connected to said mouth such that a portion of said first bracket means projects outwardly therefrom, said projecting portion having therein engagement means; and
   (b) second bracket means comprising:
      (i) a first portion having engagement means therein, said first portion engagement means having a width sufficient to allow said second bracket means to be slid under said closure fastener means head when said closure fastener means is loosened;
      (ii) a second portion at an angle from said first portion such that said second portion engages a portion of said pedestal closure outside surface when said first portion engagement means is slid under said closure fastener means head; and
      (iii) a third portion connected to said first portion in a manner to project outwardly therefrom, said third portion having a rotatable fastener means having a head, said third portion fastener means being captured to said third portion in a manner such that said third portion fastener means can be loosened or tightened by rotating its head, said first bracket means engagement means having a width sufficient to allow said first bracket means engagement means to be slid under said third portion fastener means head to thereby bring said flood cover in engagement with said second bracket means.

2. The assembly of claim 1 wherein said first bracket means engagement means is a slot.

3. The assembly of claim 2 wherein said first bracket means has a bottom edge and said slot opens towards said bottom edge.

4. The assembly of claim 3 wherein said first bracket means bottom edge has ledge means projecting outwardly therefrom.

5. The assembly of claim 1 wherein said engagement means of said second bracket means first portion is a slot means.

6. The assembly of claim 5 wherein said slot means has a first slot which projects downwardly on said first portion a predetermined distance and a second slot which projects from said first slot in a direction away from said second portion.

7. The assembly of claim 1 wherein said engagement means of said second bracket means first portion includes means for maintaining positive engagement with said closure fastener means even if said closure fastener means is left loosened.

8. The assembly of claim 1 wherein said first bracket means has an opening therein and said second bracket means first portion also has an opening therein, said first bracket means opening and said second bracket means first portion opening being in alignment when said flood cover is brought into engagement with said second bracket means to thereby allow said assembly to be locked.

9. A method for placing a flood cover assembly over a vertically standing pedestal closure having an outside surface, said pedestal closure having at least one rotatable closure fastener means having a head, said closure fastener means being captured in said outside surface such that said closure fastener means can be loosened or tightened by rotating said head, said assembly having a flood cover including a bell jar type cover having a rigid mouth and first bracket means connected to said mouth such that a portion of said first bracket means projects outwardly therefrom, said projecting portion having therein engagement means, second bracket means having a first portion having engagement means therein, said first portion engagement means having a width sufficient to allow said second bracket means to be slid under said closure fastener means head when said closure fastener means is loosened, a second portion at an angle from said first portion such that said second portion engages a portion of said pedestal closure outside surface when said first portion engagement means is slid under said closure fastener means head, and a third portion connected to said first portion in a manner to project outwardly therefrom, said third portion having a rotatable fastener means having a head, said third portion fastener means being captured to said third portion in a manner such that said third portion fastener means can be loosened or tightened by rotating its head, said first bracket means engagement means having a width sufficient to allow said first bracket means engagement means to be slid under said third portion fastener means head, said method comprising the steps of:

(a) sliding said second bracket means ·engagement means in engagement under said closure fastener means head; and (b) sliding said first bracket means engagement means under said third portion fastener means head.

10. The method of claim 9 further including the steps of:

(a) tightening said closure fastener means after said second bracket means engagement means has been slid under said closure fastener means head; and (b) tightening said third portion fastener means after said first bracket means engagement means has been slid under said third portion fastener means head.

11. The method of claim 10 further including the steps of:

(a) loosening said closure fastener means head before bringing said second bracket means engagement means in sliding engagement with said closure fastener means; and (b) loosening said third portion fastener means before bringing said first bracket means engagement means in sliding engagement with said third portion fastener means.

12. The method of claim 9 further including the steps of:

(a) loosening said closure fastener means head before bringing said second bracket means engagement means in sliding engagement with said closure fastener means; and (b) loosening said third portion fastener means before bringing said first bracket means engagement means in sliding engagement with said third portion fastener means.

* * * * *